US008392476B2

(12) United States Patent
Asano et al.

(10) Patent No.: US 8,392,476 B2
(45) Date of Patent: Mar. 5, 2013

(54) SEMICONDUCTOR MEMORY DEVICE

(75) Inventors: Shigehiro Asano, Kanagawa (JP); Kenichiro Yoshii, Tokyo (JP); Kazuhiro Fukutomi, Kanagawa (JP); Shinichi Kanno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 159 days.

(21) Appl. No.: 12/885,941

(22) Filed: Sep. 20, 2010

(65) Prior Publication Data

US 2011/0202578 A1  Aug. 18, 2011

(30) Foreign Application Priority Data

Feb. 16, 2010 (JP) ................................ 2010-031797
Sep. 14, 2010 (JP) ................................ 2010-206116

(51) Int. Cl.
*G06F 17/30* (2006.01)
(52) U.S. Cl. ........................ 707/813; 707/817
(58) Field of Classification Search .................. 707/813, 707/814, 817
See application file for complete search history.

(56) References Cited

U.S. PATENT DOCUMENTS

| | | | |
|---|---|---|---|
| 7,406,597 B2 * | 7/2008 | Iyengar et al. ................ | 713/167 |
| 7,861,122 B2 * | 12/2010 | Cornwell et al. .............. | 714/42 |
| 8,001,356 B2 * | 8/2011 | Im et al. ........................ | 711/173 |
| 8,127,134 B2 * | 2/2012 | Iyengar et al. ................ | 713/167 |
| 2003/0110343 A1 | 6/2003 | Hagiwara et al. | |
| 2006/0095460 A1 * | 5/2006 | Iyengar et al. ................ | 707/102 |
| 2007/0180186 A1 * | 8/2007 | Cornwell et al. ............. | 711/103 |
| 2007/0180328 A1 * | 8/2007 | Cornwell et al. ............. | 714/42 |
| 2007/0226252 A1 * | 9/2007 | Iyengar et al. ............ | 707/103 R |

FOREIGN PATENT DOCUMENTS

| | | |
|---|---|---|
| JP | 2006-126975 | 5/2006 |
| JP | 2007-193883 | 8/2007 |
| JP | 2009-503738 | 1/2009 |
| JP | 2009-503744 | 1/2009 |
| WO | WO 2007/019174 A2 | 2/2007 |
| WO | WO 2007/019174 A3 | 2/2007 |

OTHER PUBLICATIONS

U.S. Appl. No. 12/888,822, filed Sep. 23, 2010, Asano et al.
U.S. Appl. No. 12/885,962, filed Sep. 20, 2010, Yoshii, et al.
U.S. Appl. No. 13/037,970, filed Mar. 1, 2011, Asano, et al.
Extended European Search Report issued Jun. 8, 2011, in Patent Application No. 11154492.0.
Japanese Office Action (Decision of Rejection) issued Jul. 31, 2012, in Japan Patent Application No. 2010-206116 (with English translation).
Japanese Office Action (Decision for Dismissal of Amendment) issued Jul. 31, 2012, in Japan Patent Application No. 2010-206116 (with English translation).
U.S. Appl. No. 12/883,796, filed Sep. 16, 2010, Kazuhiro Fukutomi, et al.

(Continued)

*Primary Examiner* — Baoquoc N To
(74) *Attorney, Agent, or Firm* — Oblon, Spivak, McClelland, Maier & Neustadt, L.L.P.

(57) ABSTRACT

According to one embodiment, a semiconductor memory device performs writing of data to a semiconductor memory element in response to a request to write the data with a specified logical block address from a host and performs writing of valid data to the semiconductor memory element for compaction according to a log-structured method. The semiconductor memory device adjusts a frequency of the writing response to a request from the host and a frequency of the writing for compaction according to a predetermined ratio.

13 Claims, 9 Drawing Sheets

OTHER PUBLICATIONS

David A. Patterson, et al., "A Case for Redundant Arrays of Inexpensive Disks (RAID)", UC Berkeley Technical Report UCB/CSD-87-391, Dec. 1987, 26 pages.

James S. Plank, "A Tutorial on Reed-Solomon Coding for Fault-Tolerance in RAID-like Systems", Technical Report UT-CS-96-332, Jul. 1996, 19 pages.

Mendel Rosenblum, et al. "The LFS Storage Manager", Summer '90 USENIX Technical Conference, May 1, 1990, 16 pages.

Office Action issued Apr. 24, 2012 in Japanese Application No. 2010-206116 (With English Translation).

Japanese Office Action issued Nov. 8, 2011, in Patent Application No. 2010-206116 (with English-language translation).

* cited by examiner

| DATA | LOGICAL BLOCK ADDRESS | PAGE ECC |

FIG.11
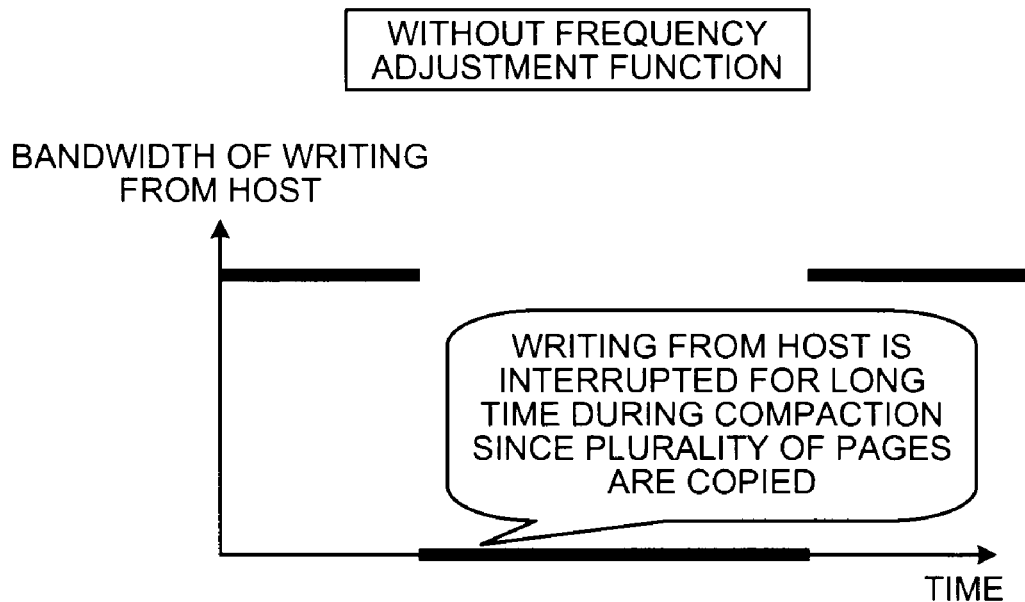
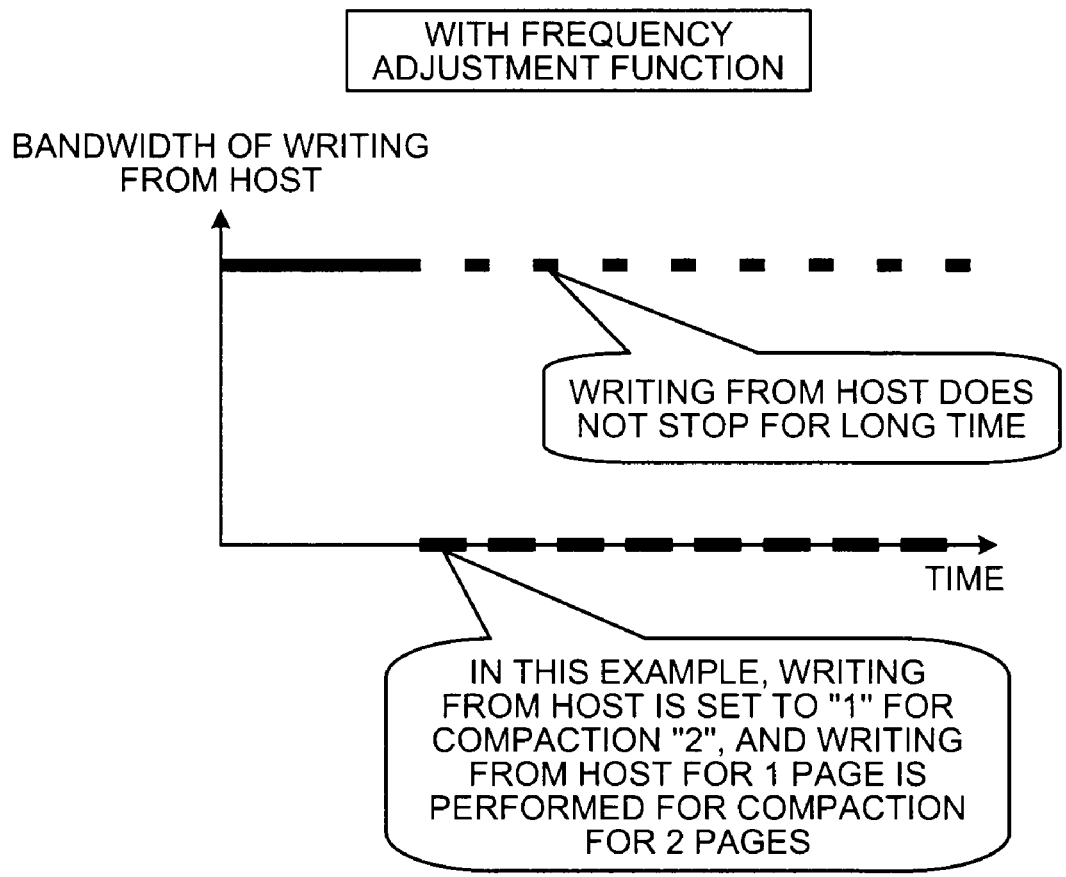

SEMICONDUCTOR MEMORY DEVICE

CROSS-REFERENCE TO RELATED APPLICATIONS

This application is based upon and claims the benefit of priority from Japanese Patent Application No. 2010-031797, filed on Feb. 16, 2010 and Japanese Patent Application No. 2010-206116, filed on Sep. 14, 2010; the entire contents of which are incorporated herein by reference.

FIELD

Embodiments described herein relate generally to a semiconductor memory device.

BACKGROUND

A semiconductor memory device using a semiconductor memory chip has been widely used in recent years due to increased capacity of a NAND-type flash memory (referred to as a NAND memory), which is one type of the semiconductor memory chip. In writing to a NAND memory, the NAND memory needs to be erased before the writing. A NAND memory is erased in blocks, such as in units of 512 KB. This is significantly large relative to 4 KB, which is a data size used relatively often in writing according to a request from a host, which is a host device of a semiconductor memory device. The size of 4 KB corresponds to the size of a page, for example, which is a smaller unit than a block. If erasure is performed each time before writing of data, erasure in units of a 512-KB block is performed for writing in units of a 4-KB page.

Meanwhile, there is an upper limit set for the number of erasures of the NAND memory as a characteristic of a semiconductor memory chip, and it is undesirable to exceed the upper limit in terms of reliability. In the related art, a log-structure that has been long used in file systems and databases, for example, is used to control the number of erasures. In this technique, data is written in an erased block in units of a 4-KB page sequentially in the order of pages regardless of a logical block address (LBA) specified by a host, the association of a physical address (PA) indicating a physical storage location where data is written and the logical block address is stored, and data is read using the association of addresses. This system is called a log-structured method.

A plurality of requests for writing different data to the same logical block address may be made. These different data are basically written in different pages. A page in which old data (referred to as invalid data) is written becomes invalid and a page in which new data (referred to as valid data) is written becomes valid. When the amount of invalid data increases, the capacity of a NAND memory at which writing can be realized (referred to as realizable capacity) gradually decreases. When a new erased block in which data can be written, namely a block (referred to as a free block) in which data is not yet written after erasure thereof, cannot be reserved any longer, writing becomes impossible. To avoid this, the semiconductor memory device collects valid data in blocks containing invalid data, newly rewrites the collected valid data in free blocks to move the valid data thereto, erases, as blocks containing only invalid data, the blocks from which the valid data are moved, and performs garbage collection to newly generate free blocks. The garbage collection performed in a NAND memory using the log-structured method is particularly referred to as compaction. In the semiconductor memory device, blocks that were unwritable become writable again by performing the compaction, allowing free blocks to be reserved.

In the related art, the compaction is performed when the free blocks are exhausted or immediately before they are exhausted. However, when the compaction is performed, the bandwidth of the NAND memory is squeezed due to reading and writing of valid data, which may lead to significant decrease in response speed to data write requests from the host.

BRIEF DESCRIPTION OF THE DRAWINGS

FIG. 11 is a diagram for comparing a case with a frequency adjustment function and a case without a frequency adjustment function.

DETAILED DESCRIPTION

In general, according to one embodiment, a semiconductor memory device includes a semiconductor memory chip having a plurality of storage areas; a first write control unit configured to receive a request for writing first data associated with a logical block address from an information processing device, and perform a first writing of writing the first data in an unwritten location in an erased storage area among the storage areas of the semiconductor memory chip; a first storage unit configured to store therein association information representing association between a physical address indicating the location in which the first data is written and the logical block address associated with the first data; a second write control unit configured to receive a request for writing third data associated with a same logical block address as that associated with second data, which is already written, and write the third data in an unwritten location in an erased storage area from which data has been erased among the storage areas of the semiconductor memory chip; a first updating unit configured to update the association information to association information indicating association between the logical block address and a physical address for the third data when the third data is written by the second write control unit; a third write control unit configured to perform garbage collection by performing a second writing of writing fourth data, which is not invalid and which is in the storage area of the semiconductor memory chip in which the second data was previously written, in another storage area that is erased; and a frequency adjusting unit configured to adjust, according to a ratio set in advance, a frequency of the first writing in response to a request from the information processing device and a frequency of the second writing for the garbage collection.

Exemplary embodiments of a semiconductor memory device will be described below in detail with reference to the accompanying drawings.

Figure 1:
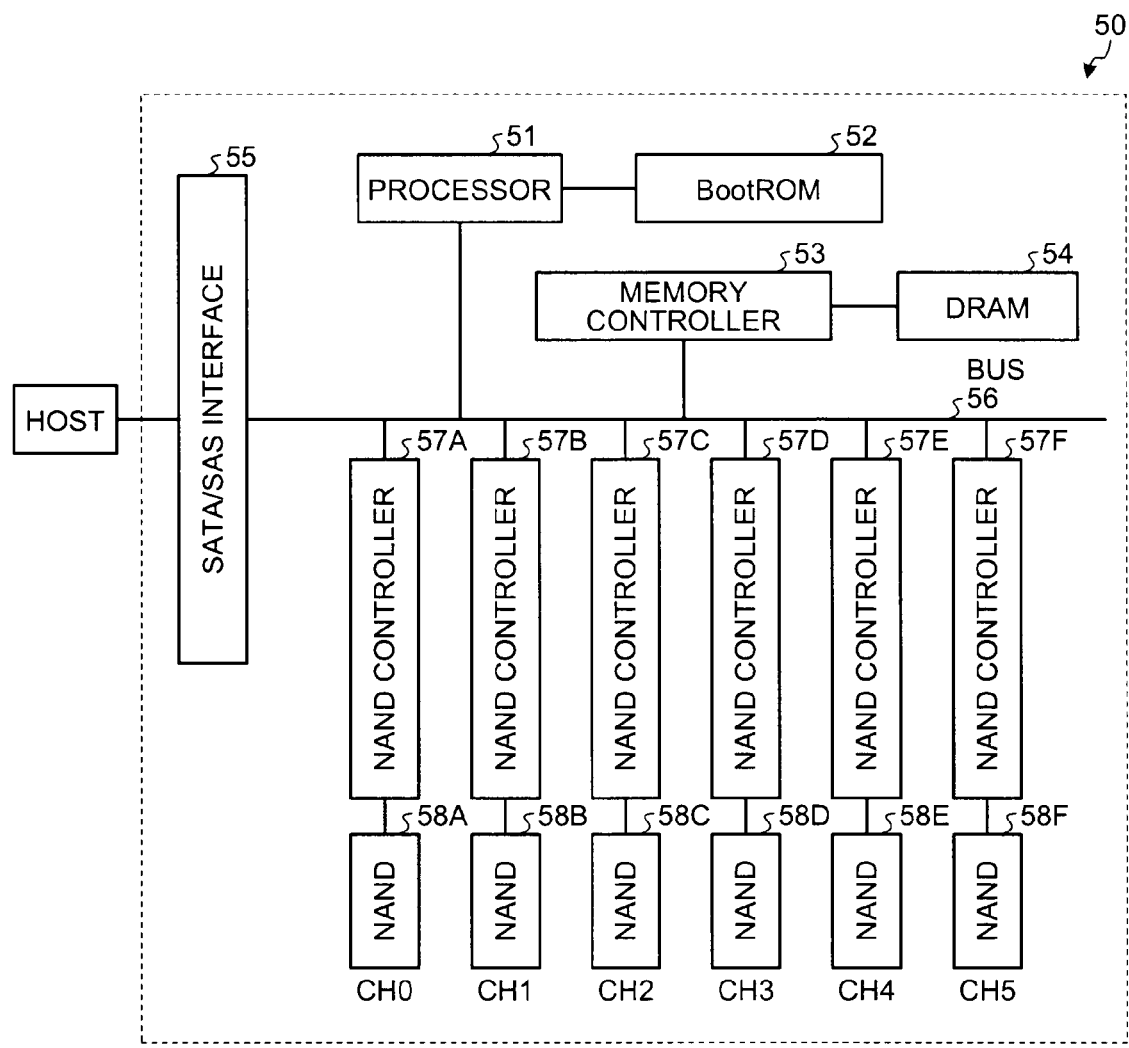
FIG. 1 is a diagram illustrating a hardware configuration of a semiconductor memory device 50 according to an embodiment.

First, a hardware configuration of the semiconductor memory device according to the embodiment will be described using FIG. 1. The semiconductor memory device 50 includes a processor 51, a boot read only memory (BootROM) 52, a SATA/SAS interface 55, a memory controller 53, a dynamic random access memory (DRAM) 54, NAND controllers 57A to 57F, semiconductor memory elements (NANDs) 58A to 58F, and a bus 56 which connects these components. The NAND controllers 57A to 57F may be simply referred to as the NAND controller(s) 57 when it is not necessary to distinguish each of the NAND controllers 57A to 57F. Similarly, the semiconductor memory elements 58A to 58F may be simply referred to as the semiconductor memory element(s) 58 when it is not necessary to distinguish each of the semiconductor memory elements 58A to 58F.

The SATA/SAS interface 55 controls communication with a host, which is a host device of the semiconductor memory device 50, under the control of the processor 51. The BootROM 52 stores a program executed when power is turned on. Various system programs are stored in the semiconductor memory elements 58. The processor 51 reads and executes a program from the BootROM 52 when power is turned on, transfers various system programs stored in the semiconductor memory elements 58 to the DRAM 54 according to the executed program, and executes the system programs on the DRAM 54 to control the entire semiconductor memory device 50 and implement various functions. Specifically, the processor 51 interprets commands transmitted from the host via the SATA/SAS interface 55, and controls writing of data to the semiconductor memory elements 58 and reading of data from the semiconductor memory elements 58 according to the commands.

The memory controller 53 controls the DRAM 54. The DRAM 54 stores various data and various programs. In the embodiment, the DRAM 54 stores a lookup table and a bit vector table, which will be described later. The NAND controllers 57 control the semiconductor memory elements 58 and each include an error correction circuit.

The semiconductor memory elements 58 are semiconductor chips, and are memory elements used in NAND flash memories, for example. Data cannot be read and written randomly from/to such semiconductor memory elements 58 but data can be read and written in a unit called a page. A plurality of pages constitute a memory area in a unit called a block. Here, one page equals 4 KB, and 64 pages constitute one block. One semiconductor memory element 58 is constituted by a plurality of blocks. In the embodiment, the number of semiconductor memory elements 58 is six, as illustrated in FIG. 1. One channel (CH0 to CH5) is assigned to each of the semiconductor memory elements 58A to 58F. As will be described later, the semiconductor memory device 50 splits data into a plurality of pieces when the data required by the host to be written is larger than the page size, and allocates and writes the data pieces split in pages (referred to as split pieces of data) to the respective channels CH0 to CH5.

Figure 2:
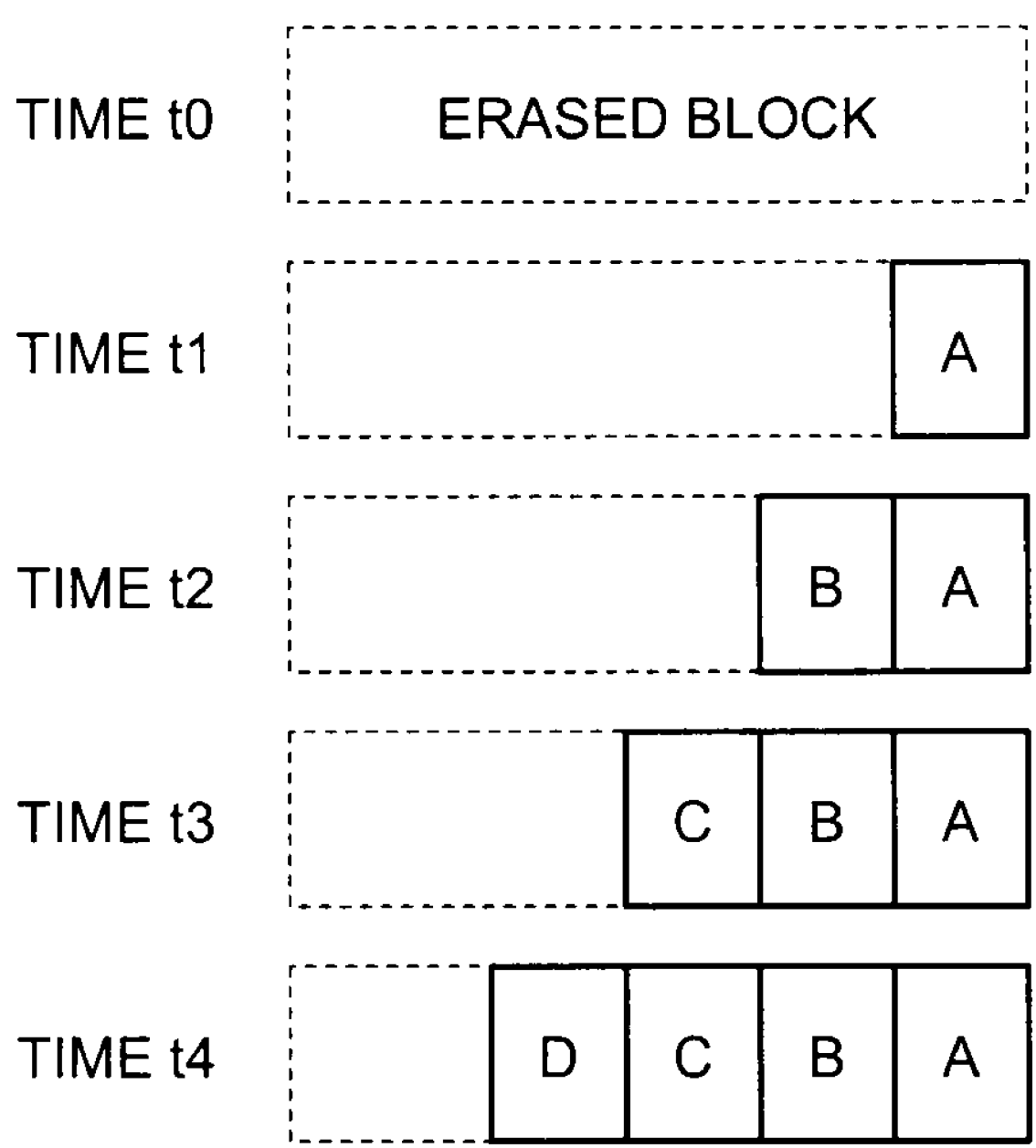
FIG. 2 is a diagram illustrating how write target data are written with time.

Here, a write method for writing to the semiconductor memory elements 58 is described using FIG. 2. A NAND semiconductor memory element conventionally employs the log-structured method as described above. In the log-structured method, a block needs to be erased before writing. Erasure of a block is to set all bits constituting the block to "1". The semiconductor memory device 50 performs such erasure in units of a block and performs writing in units of a page to the erased blocks. Accordingly, in the NAND semiconductor memory elements 58, data can be sequentially written to unwritten pages in an erased block, and written pages cannot be added other pages. Writing of data response to the request from the host is indicated by a logical block address used in the host. On the other hand, writing of data to the semiconductor memory elements 58 is performed according to the physical addresses of the semiconductor memory elements 58 in the ascending order of pages regardless of the logical block address. Specifically, at time t1, first data A is written in a first page (at the beginning or at the end) in an erased block reserved at time t0 on a certain channel, and at time t2, data B that is newly allocated to the channel is written in a second page, as illustrated in FIG. 2. Similarly, at time t3, data C is written in a third page and at time t4, data D is written in a fourth page. The association between the physical address indicating the storage location to which data is thus written and the logical block address is stored in the lookup table described later. When writing of new data is requested by the host with the logical block address specified in the previous data request being specified again, the semiconductor memory device 50 writes the new data to an unwritten page of an erased block. In this case, the page to which writing corresponding to this logical block address is previously performed is set to be invalid and the page to which the new data is written is set to be valid.

"Invalid" is the status in which a logical address does not indicate (is not associated with) the location of a physical address, whereas "valid" is the status in which a logical address indicates (is associated with) the location of a physical address.

Thus, when data is invalid, a logical address does not indicate the location of a physical address of a memory area, in which the data is stored. When data is valid, a logical address indicates the location of a physical address of a memory area, in which the data is stored.

When a page is invalid, a logical address does not indicate the location of a physical address of a memory area, which corresponds to the page. When a page is valid, a logical address indicates the location of a physical address of a memory area, which corresponds to the page.

In the above-mentioned example, a method using a bit vector is employed in order to express valid and invalid; however, the method is not limited thereto. For example, a method can be employed in which a block is selected and then each page is sequentially selected, and a page is determined to be valid when a logical address that indicates the selected page is present. A page is determined to be invalid when a logical address that indicates the selected page is not present. In order to determine whether such a logical address is present or not, a method can be employed in which a lookup table is accessed to sequentially check whether a logical address indicating the selected page is present. Alternatively, a method using a reverse lookup table, in which a physical address is associated with a logical address, can be employed to check whether a logical address indicating the selected page is present.

Figure 3:
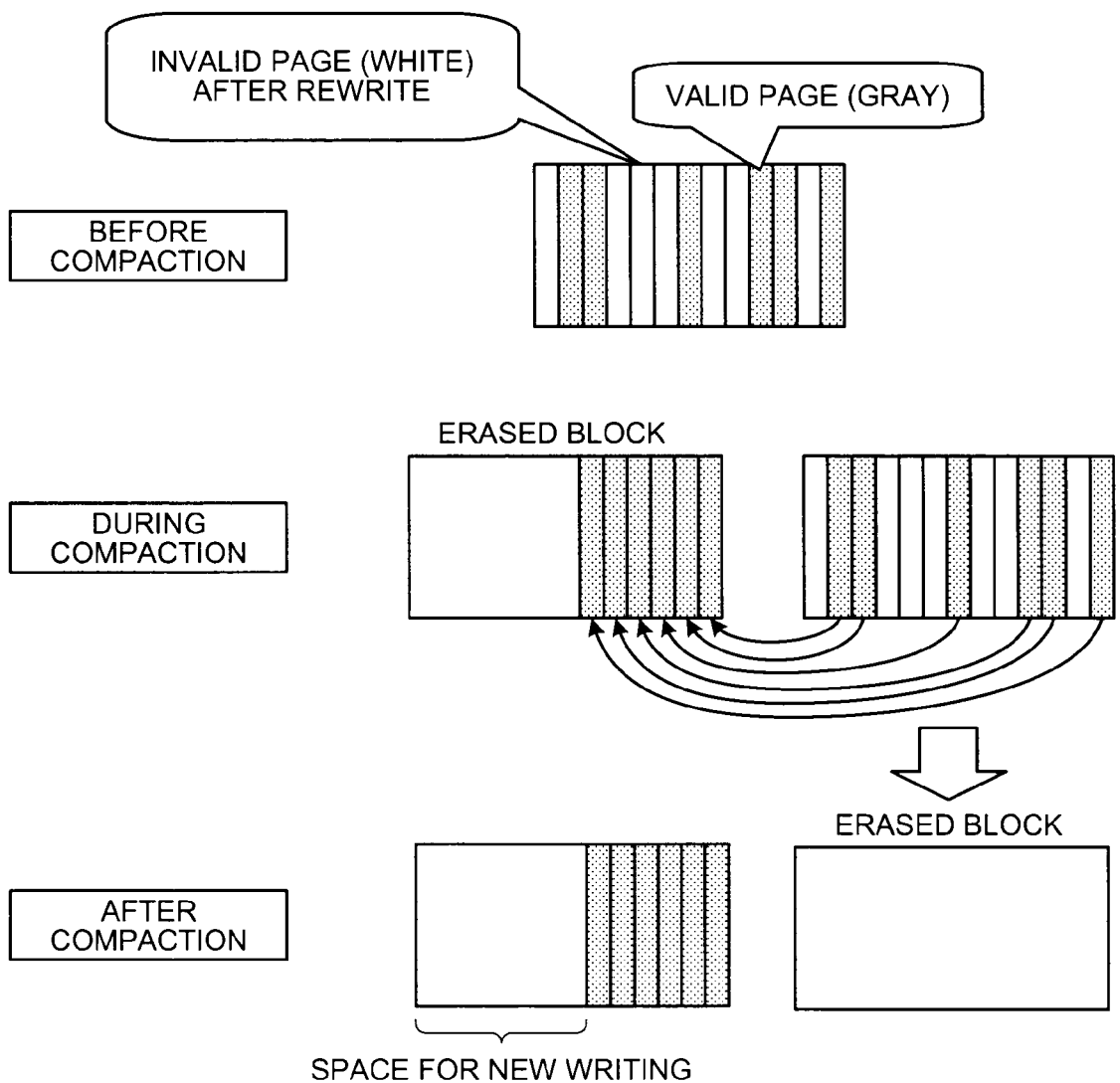
FIG. 3 is a conceptual diagram for describing compaction.

In this log-structured method, compaction is performed to reserve the free blocks as described above in the semiconductor memory device 50 as illustrated in FIG. 3. Further, as illustrated in FIG. 3, if there is an unwritten page in a block in which valid data is written as a result of moving data, data can be newly written to the page. At least one free block is needed to perform such compaction, which means that the capacity (referred to as implemented capacity) implemented in the NAND semiconductor memory element 58 is smaller than the capacity at which writing can be actually realized. In the embodiment, the difference between the implemented capacity and the realizable capacity is referred to as spare capacity. When the spare capacity is small, the semiconductor memory device 50 has to frequently carry out compaction, which has a great impact on performance thereof.

Next, functions implemented in the semiconductor memory device 50 will be described using FIG. 4. The semiconductor memory device 50 includes a host interface unit 60, a buffer control unit 61, an address translation unit 62, a CH allocating unit 63, a compaction candidate detecting unit 64, a management table updating unit 65, NAND control units 66A to 66F, a data buffer 67, a compaction queue 68, a management table 69, a host queue 70 and a frequency adjusting unit 77. The frequency adjusting unit 77 includes a host write/compaction write selecting unit 71, a condition determining unit 72, a host write counter 73, a compaction write counter 74, a frequency register 75 and a frequency register updating unit 76. The function of the host interface unit 60 is implemented by the processor 51 executing programs and the function of the SATA/SAS interface 55. The functions of the address translation unit 62, the CH allocating unit 63, the management table updating unit 65, the compaction candidate detecting unit 64, the buffer control unit 61, the host write/compaction write selecting unit 71, the condition determining unit 72, the host write counter 73, the compaction write counter 74, and the frequency register updating unit 76 are implemented by the processor 51 executing programs. The functions of the NAND control units 66A to 66F correspond to those of the NAND controllers 57A to 57F, respectively, and are implemented by the processor 51 executing programs and by the functions of the NAND controllers 57A to 57F respectively corresponding to the NAND control units 66A to 66F. The NAND control units 66A to 66F correspond one-to-one to the semiconductor memory elements 58A to 58F to which the channels CH0 to CH5 are allocated, respectively. However, the NAND control units 66A to 66F may be simply referred to as the NAND control unit(s) 66 when it is not necessary to distinguish each of the NAND control units 66A to 66F. The data buffer 67, the compaction queue 68, the management table 69, the host queue 70 and the frequency register 75 are stored on the DRAM 54, for example.

The host interface unit 60 is an interface that controls communication between the host and the semiconductor memory device 50. The host interface unit 60 receives a command transmitted from the host. When the command requests writing of data with a specified logical block address, the host interface unit 60 stores the command (referred to as a write command) in the host queue 70. When the size of the data requested to be written is the page size or smaller, the host interface unit 60 sends the data to the buffer control unit 61, which will be described later. On the other hand, when the size of the data is larger than the page size, the host interface unit 60 splits the data into pieces in units of a page, and sends the data thus split (referred to as split pieces of data) to the buffer control unit 61. This is because the translation between the logical block address and the physical address is made in units of a page. For example, the host interface unit 60 splits data of 128 KB into thirty-two pieces of 4-KB data. The data or the split pieces of data sent to the buffer control unit 61 in response to the write command is referred to as write target data for convenience of description.

Figure 5:
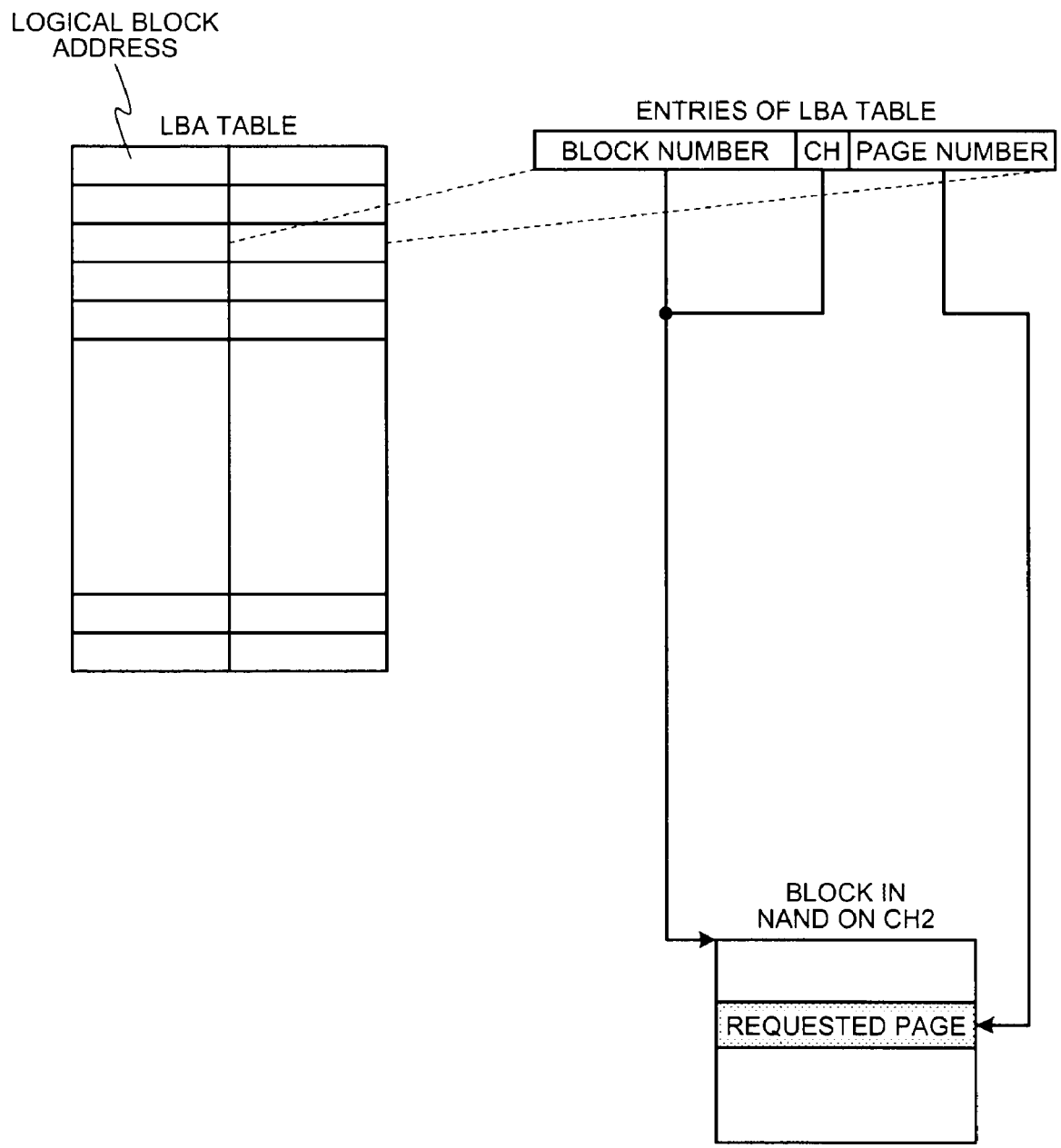
FIG. 5 is a diagram illustrating data configuration of a lookup table.

The management table 69 includes the lookup table (LBA table) and the bit vector table. The lookup table is a table showing the association between the logical block address of write target data and the physical address indicating the physical storage location to which the write target data is written in the semiconductor memory elements 58. The lookup table is used in determining the physical address indicating the location on the semiconductor memory elements 58 in which data associated with the logical block address specified by the host is stored. FIG. 5 is a diagram illustrating data configuration of the lookup table. As illustrated in FIG. 5, entries of the lookup table include the logical block address as the index thereof, the number of block (referred to as block number), the channel number and the page number given to the page. The logical block address of each write target data is calculated based on the logical block address specified in a data write request from the host. The block number is given to each of the blocks sequentially from the beginning, for example. The channel number is CH0 to CH5 in this embodiment, and indicates to which channel the semiconductor memory element 58 including the physical in which data associated with the logical block address is stored is connected. The page number indicates in which page of the physical block identified by the block number and the channel number the data associated with the logical block address is stored. The page number may be given in the sequence of the physical addresses, or the physical address itself may be given as the page number, for example. The lookup table is updated each time write target data is written to the semiconductor memory element 58. How the lookup table is updated will be described later.

Figure 6:
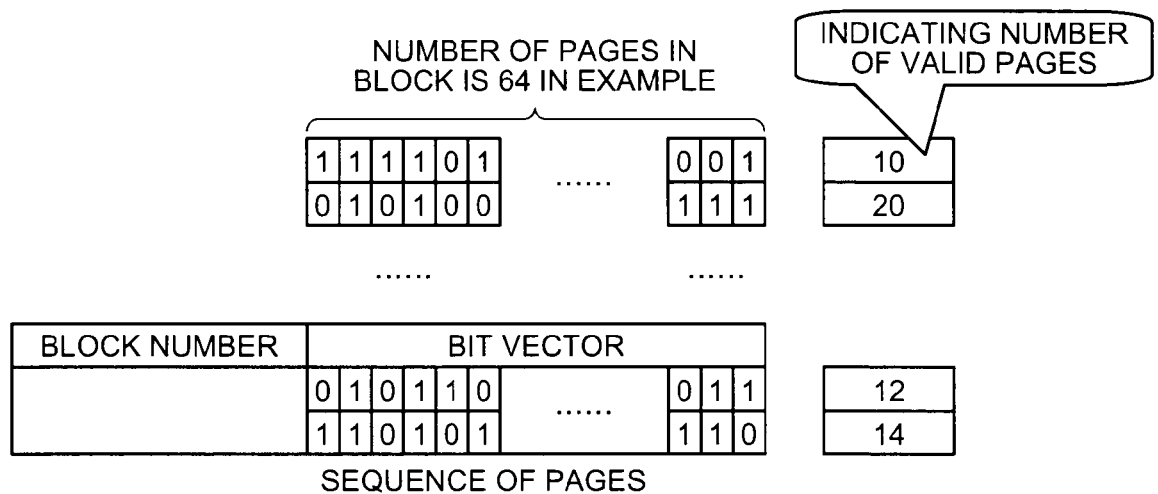
FIG. 6 is a diagram illustrating data configuration of a bit vector table.

Next, the bit vector table will be described with reference to FIG. 6. The bit vector table is a table showing in binary in the sequence of pages which pages in each block on each channel are pages (referred to as valid pages) to which valid data are written. The binary indication for each page is called a bit vector. If the value of the bit vector is "1", this means that the page is a valid page, and if the value is "0", this means that the page is not a valid page (invalid). In the initial state, the values of the bit vectors are all set to "0". In the embodiment, if it is assumed that one block includes 64 pages, 64 bit vectors are associated per one block. As illustrated in FIG. 6, the bit vector table includes, for each block, the above-described block number as the index thereof, the bit vector associated with each page included in the block to which the block number is given, and a counter. The counter represents the total number of bit vectors whose values are "1". Since a page whose corresponding bit vector has a value "1" is a valid page, the counter represents the number of valid pages in a block (hereinafter referred to as a valid page number counter). In such a configuration, the bit vector table is updated each time the system requests writing of data. How the bit vector table is updated will be described later.

Figure 4:
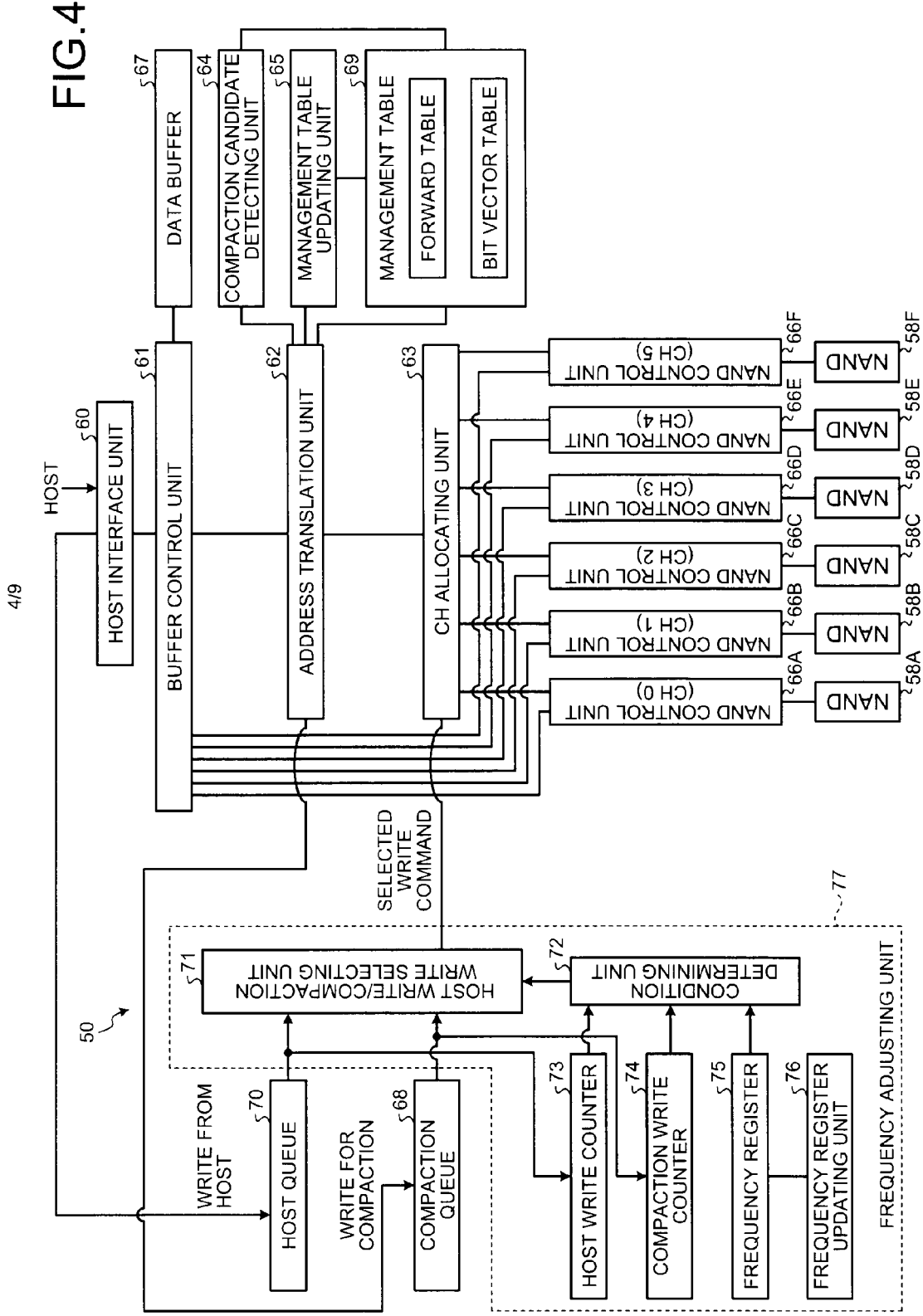
FIG. 4 is a diagram illustrating functions implemented in the semiconductor memory device 50.

The description refers back to FIG. 4. The compaction candidate detecting unit 64 refers to the bit vector table included in the management table 69, determines a block to be a candidate for compaction, specifies a physical address of a valid page in the block, and sends a command (referred to as a compaction read command) requesting to read the valid page to the address translation unit 62.

The data buffer 67 is a buffer storing the write target data. The compaction queue 68 is a first-in first-out buffer that stores a command (referred to as compaction write command) requesting to write valid data for compaction. The host queue 70 is a first-in first-out buffer that stores a write command from the host.

The frequency adjusting unit 77 adjusts the frequency of writing in response to write commands from the host and the frequency of writing for compaction, in accordance with a frequency adjustment value set in the frequency register 75, which will be described later. Specific functions to implement the functions described above are as follows. The host write counter 73 calculates in units of a page the number of writing operations performed in response to write commands from the host. The compaction write counter 74 calculates in units of a page the number of writing operations performed in response to compaction write commands.

The frequency register 75 is a register in which the frequency adjustment value to adjust the frequency of writing in response to write commands from the host and the frequency of writing for compaction is set. For example, a ratio of the number of writing operations for compaction to the number of writing operations in response to write commands from the host is set as the frequency adjustment value in the frequency register 75. That is, when M (M is a positive integer) writing operations in response to write commands from the host are performed, the frequency adjustment value (N/M) is set in the frequency register 75 so that N (N is a positive integer) writing operations for compaction are performed.

Figure 7:
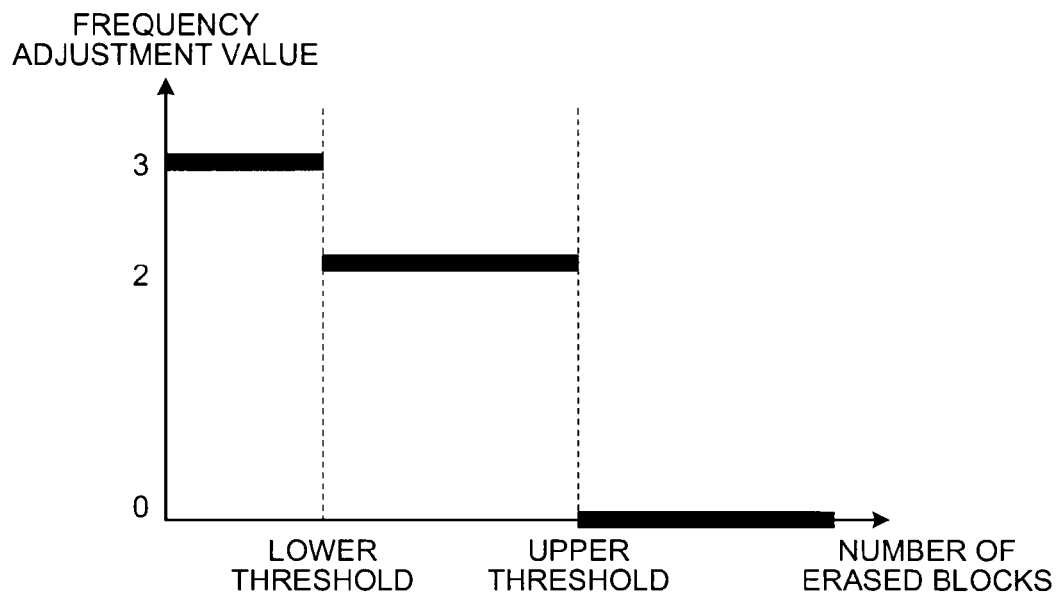
FIG. 7 is a graph for describing an example of updating frequency adjustment value.

The frequency register updating unit 76 updates the frequency adjustment value of the frequency register 75. Specifically, the frequency register updating unit 76 updates the frequency adjustment value according to the number of free blocks. FIG. 7 is a graph for describing an example of updating the frequency adjustment value. When the number of free blocks decreases smaller than a lower threshold, the frequency register updating unit 76 sets the frequency adjustment value to "3", for example, so that three times as many writing operations for compaction as writing operations in response to write commands from the host are performed. When many writing operations for compaction are performed, the number of free blocks increases as a result of the compaction. When the number of free blocks is between the lower threshold and an upper threshold, the frequency register updating unit 76 sets the frequency adjustment value to "2" so that twice as many writing operations for compaction as writing operations in response to write commands from the host are performed. When the number of free blocks exceeds the upper threshold as a result of compaction, the frequency register updating unit 76 sets the frequency adjustment value to "0" so that only writing operations in response to write commands from the host are performed. It should be noted that the upper threshold is a larger value than the lower threshold and the thresholds are preset and stored in the DRAM 54. The host write counter 73 and the compaction write counter 74 are reset when they reach the values set in the frequency register 75. For example, when the frequency adjustment value is "3", the host write counter 73 is reset at "1" and the compaction write counter 74 is reset at "3".

The condition determining unit 72 determines whether to perform writing in response to write commands from the host or to perform writing for compaction, in accordance with the frequency adjustment value set in the frequency register 75, the value calculated by the host write counter 73 and the value calculated by the compaction write counter 74, and sends the determination result indicating which writing is determined to the host write/compaction write selecting unit 71.

The host write/compaction write selecting unit 71 receives the determination result from the condition determining unit 72. If the determination result indicates that writing in response to write commands from the host is to be performed, the host write/compaction write selecting unit 71 fetches a write command from the host queue 70 and sends the command to the CH allocating unit 63. That is, in this case, the host write/compaction write selecting unit 71 causes a NAND control unit 66 to perform writing in response to the write command from the host via the CH allocating unit 63. On the other hand, if the determination result indicates that writing for compaction is to be performed, the host write/compaction write selecting unit 71 fetches a compaction write command from the compaction queue 68 and sends the command to the CH allocating unit 63. That is, in this case, the host write/compaction write selecting unit 71 causes a NAND control unit 66 to perform writing for compaction via the CH allocating unit 63.

The description refers back to FIG. 4. The address translation unit 62 receives a compaction read command from the compaction candidate detecting unit 64, refers to the lookup table, and sends a command requesting to read data (valid data) in a valid page indicated with the physical address by the compaction read command to a NAND control unit 66 corresponding to a channel to which the semiconductor memory element 58. The valid data is read from the semiconductor memory element 58 via the NAND control unit 66 and stored in the data buffer 67 via the buffer control unit 61. The address translation unit 62 stores the command (compaction write command) requesting writing of the valid data in the compaction queue 68.

The CH allocating unit 63 receives the command from the host write/compaction write selecting unit 71, and when the command is a write command, determines the channel to which write target data is to be written. For example, the CH allocating unit 63 performs writing operations in round robin fashion in 4 KB and determines the channel to which data is written according to the order of round robin. Then, the CH allocating unit 63 sends the command requesting to write the write target data to the NAND control unit 66 corresponding to the determined channel. If the command received from the host write/compaction write selecting unit 71 is a compaction write command, the CH allocating unit 63 determines the channel to which data is written, and sends the command requesting to write valid data to the NAND control unit 66 corresponding to the determined channel.

The NAND control unit 66 receives the command from the CH allocating unit 63 and accesses the corresponding semiconductor memory element 58 according to the command. Specifically, when the command requests to write data, the NAND control unit 66 retrieves write target data via the buffer control unit 61 and write the write target data to the semiconductor memory element 58. In the writing, the NAND control unit 66 sets a recording pointer to sequentially point a writing location, page by page, out of unwritten pages in an erased block of the corresponding semiconductor memory element 58, writes the write target data to a page at a location pointed by the recording pointer, and then updates the recording pointer to point a location of another page. Therefore, the value of the recording pointer changes to sequentially point the next writing location. For example, when a block is identified by a physical address of 15 bits in each channel and the block includes 64 pages, the recording pointer has 15+6=21 bits in total.

Figures 8, 9:
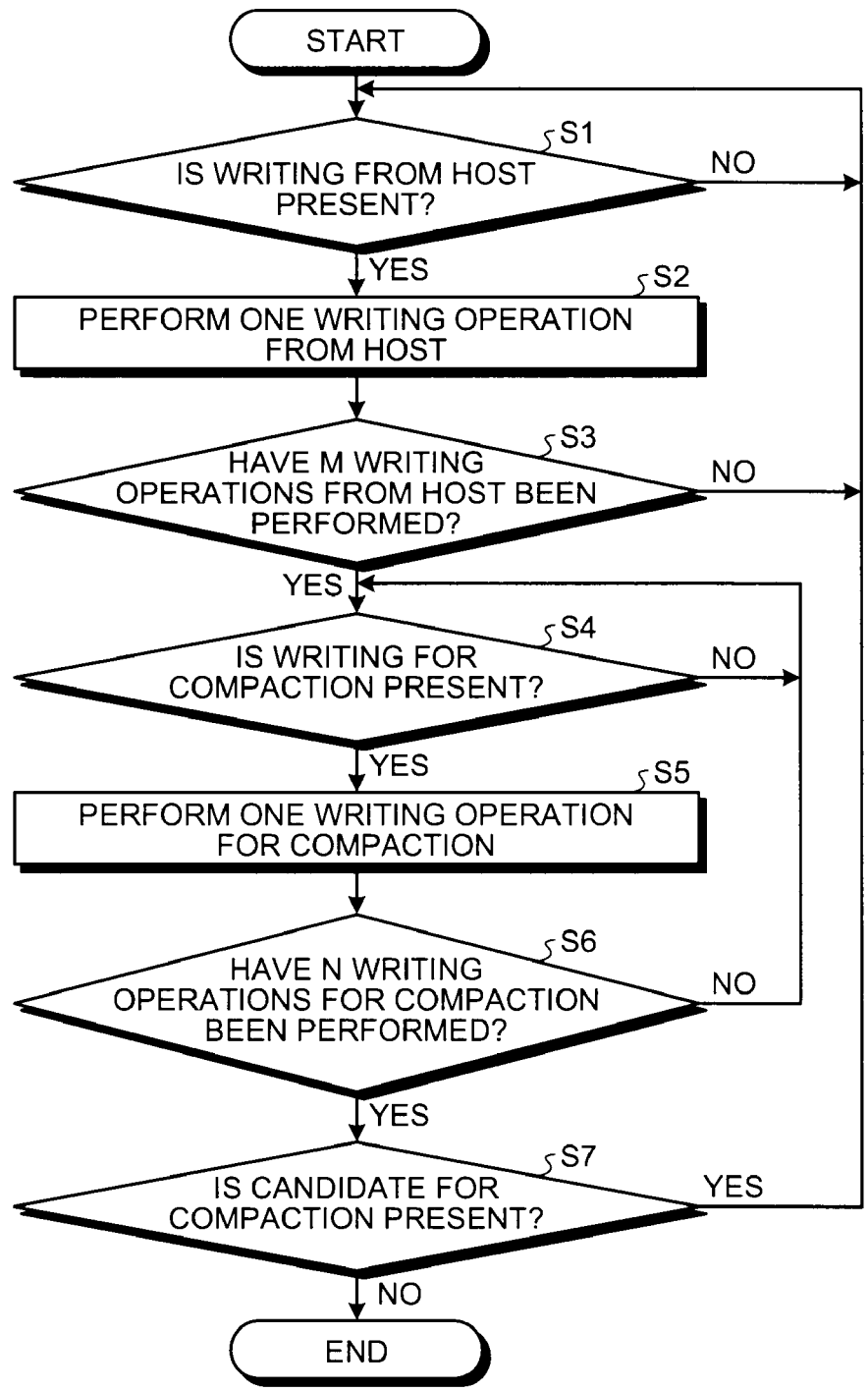
FIG. 8 is a diagram illustrating write target data.
FIG. 9 is a flowchart illustrating procedures of a frequency adjustment process.

Here, the data configuration of write target data will be described. The NAND control unit 66 adds an error correction code (referred to as a page ECC) for detecting and correcting an error of the write target data itself and a logical block address specified by a write command to the write target data. The page ECC includes codes such as a CRC code for detecting a data error, and an ECC code to correct the data error. The reason why the page ECC also includes a CRC code is that there is a possibility of miss correction when the data error is corrected to erroneous data with the ECC code. FIG. 8 is a diagram illustrating write target data to which a redundant portion is added. In the semiconductor memory element 58 of each channel determined as described above, the NAND control unit 66 writes the write target data to which the page ECC and the logical block address are added to a page in the semiconductor memory element 58 pointed by the recording pointer. The write target data has a size in a unit of pages, and the page size of the semiconductor memory element 58 equals the size of the entire data including the write target data and the added page ECC and logical block address. The logical block address of each of split pieces of data is calculated by each NAND control unit 66 based on the logical block address specified by the write command.

When the command received from the address translation unit 62 requests to read data (valid data) in a valid page with a specified physical address, the NAND control unit 66 reads data written in a page corresponding to the physical address in the semiconductor memory element 58 using the physical address and stores the read data in the data buffer 67. When the command received from the CH allocating unit 63 requests to write valid data, the NAND control unit 66 retrieves write target valid data via the buffer control unit 61 and writes the valid data to the semiconductor memory element 58.

The buffer control unit 61 manages the data buffer 67 as a plurality of areas and manages the areas in which data corresponding to the commands are stored. Specifically, the buffer control unit 61 stores write target data sent from the host interface unit 60 in response a write command in the data buffer 67, and sends the write target data to the NAND control unit 66 corresponding to the channel determined to be written to by the CH allocating unit 63. The write target data is written in the semiconductor memory element 58 via the NAND control unit 66. The buffer control unit 61 stores the data read from the semiconductor memory element 58 via the NAND control unit 66 to the data buffer 67 in response to the compaction read command, transfers the stored data to the NAND control unit 66 and writes the data in the semiconductor memory element 58.

When a command (write command) requesting to write data with a specified logical block address is received from the host, the management table updating unit 65 refers to the lookup table and updates the bit vector table, and further updates the lookup table. Specifically, the management table updating unit 65 first refers to the lookup table to look up in which page in which block the data associated with the physical address associated with the logical block address, namely the data associated with the logical block address, is written. If the physical address associated with the logical block address is not stored in the lookup table, writing of data associated with the logical block address has not been performed until now. In this case, the management table updating unit 65 sets the value of the bit vector for the page to which the data associated with the logical block address is written to "1". The page to which data is written is pointed by the recording pointer. The management table updating unit 65 also increments the value of the valid page number counter corresponding to the block that includes the page by 1.

On the other hand, if the physical address associated with the logical block address is stored in the lookup table when the management table updating unit 65 refers to the lookup table, writing of the data associated with the logical block address has been performed before. In this case, it is necessary to invalidate the data written before due to the write command for the present writing. Therefore, the management table updating unit 65 sets the value of the bit vector corresponding to the page at the physical address stored in the entries of the lookup table referred to for the logical block address specified by the write command to "0". The value of the valid page number counter of the logical block associated with the physical block that includes the page is decremented by 1. Further, the management table updating unit 65 sets the value of the bit vector corresponding to the page to which the write target data is to be written to "1", and increments the value of the valid page number counter of the logical block associated with the physical block that includes the page by 1. By updating the bit vector table and the valid page number counter each time writing of data is performed, the bit vector table and the valid page number counter always indicate the locations of valid pages and the number thereof. Finally, the management table updating unit 65 records the physical address of the page to which the write target data is written in an entry associated with the logical block address in the lookup table. By updating the bit vector table each time writing of data is performed, the bit vector table always indicates valid pages and the number thereof. When compaction is performed, the management table updating unit 65 updates the physical address of the page to which the valid data is moved in the lookup table.

Next, procedures of processes performed by the semiconductor memory device 50 according to the embodiment will be described. First, procedures of a frequency adjustment process will be described using FIG. 9. It is assumed that the frequency adjustment value of the frequency register 75 is set to "N/M". The semiconductor memory device 50 determines whether a write command is present in the host queue 70 (step S1). If there is no write command (NO in step S1), the process returns to step S1. If a write command is present (YES in step S1), the semiconductor memory device 50 determines to perform writing in response to write commands from the host, and fetches one write command from the host queue 70. When the size of the data requested to be written by the write command is the page size or smaller, the semiconductor memory device 50 stores the data (write target data) in the data buffer 67. When the size of the data requested to be written by the write command is larger than the page size, the semiconductor memory device 50 splits the data in units of a page and stores the split pieces of data (split pieces of data: write target data) in the data buffer 67.

Then, the semiconductor memory device 50 performs one writing operation of write target data in units of a page (step S2). Specifically, the semiconductor memory device 50 refers to the lookup table based on the logical block address specified by the write command and, when a physical address associated with the logical block address of the write target data is already stored therein, stores the physical address as an old physical address in the DRAM 54, for example. The semiconductor memory device 50 also determines a channel to which the write target data is to be written, and writes the write target data with a page ECC and the logical block address added thereto to a page pointed by the recording pointer in the semiconductor memory element 58 of the determined channel. Then, the semiconductor memory device 50 updates the recording pointer to point a next unwritten page following the page to which the write target data is written. The semiconductor memory device 50 also records association between the logical block address of the write target data and the physical address of the page to which the write target data is written in the lookup table illustrated in FIG. 5. If the write target data is split pieces of data, the semiconductor memory device 50 calculates each of the physical addresses of the split pieces of data based on the logical block addresses specified by the write command. Since the split pieces of data are in units of a page, the semiconductor memory device 50 calculates values obtained by sequentially adding the page size to the specified logical block address as the logical block addresses of the split pieces of data. Then, the semiconductor memory device 50 records the logical block addresses, block numbers given to the blocks of the respective channels to which the write target data are written, and a channel number of the channel and a page number of the page to which the write target data is written in the current process in the lookup table. The semiconductor memory device 50 thus updates the lookup table. Further, the semiconductor memory device 50 refers to the bit vector table, sets the value of the bit vector corresponding to the page of the old physical address stored in the DRAM 54 in step S2 to "0", and decrements the value of the valid page number counter of the block including the page by 1. The old physical address indicates a page to which data is previously written in association with the logical block address specified by the write command. Accordingly, the value of the bit vector is set to "0" and the number of valid pages in the block that includes the page is decremented by 1 so that the data written in the page is to be invalidated. Further, the semiconductor memory device 50 sets the value of the bit vector corresponding to the page to which the write target data is written to "1", and increments the value of the valid page number counter of the block that includes the page by 1 in the bit vector table. The semiconductor memory device 50 thus updates the bit vector table.

Subsequently, the semiconductor memory device 50 increments the value of the host write counter 73 by 1, and determines whether the value has reached "M" or not (step S3). If the value is not "M" (NO in step S3), the process returns to step S1. When the data requested to be written by the write command from the host is split in units of a page and if unwritten split pieces of data still remain, the process returns to step S2 where the semiconductor memory device 50 performs writing of each split piece of data. That is, the semiconductor memory device 50 performs the process of step S2 once for each split piece of data in units of a page.

On the other hand, if the value of the host write counter 73 is "M" (YES in step S3), the semiconductor memory device 50 initializes the value of the host write counter 73 to "0" and determines to perform writing for compaction, and then determines whether or not a compaction write command is present in the compaction queue 68 (step S4). If there is no compaction write command (NO in step S4), the process returns to step S4. If a compaction write command is present (YES in step S4), the semiconductor memory device 50 fetches one compaction write command and performs one writing operation of valid data in units of a page according to the compaction write command (step S5). The writing is performed in the same manner as in step S2. The logical block address that is added to the valid data is used as the logical block address associated with the valid data.

Subsequently, the semiconductor memory device 50 increments the value of the compaction write counter 74 by 1, and determines whether or not the value has reached "N" (step S6). If the value is not "N" (NO in step S6), the process returns to step S4. If the value is "N" (YES in step S6), the semiconductor memory device 50 initializes the value of the compaction write counter 74 to "0" and determines whether or not a candidate block for compaction is present (step S7). Specifically, the semiconductor memory device 50 refers to the value of the valid page number counter in the bit vector table, and determines whether or not a block having this value equal to or smaller than a predetermined value, namely a block including a number smaller than the predetermined value of valid pages, is present. Then, if there is no such block (NO in step S7), the process ends. On the other hand, if such a block is present (YES in step S7), the semiconductor memory device 50 sets the block as a candidate for compaction, identifies data (valid data) stored in pages (valid pages) with a bit vector in the bit vector table being "1" in the block, and reads all the valid data to the data buffer 67. Further, the semiconductor memory device 50 extracts the logical block address added to the valid data. Then, the semiconductor memory device 50 stores the compaction write command requesting to write the read valid data in the compaction queue 68, and the process returns to step S1.

As described above, writing according to requests from the host and writing for compaction are switched according to the predetermined frequency adjustment value. That is, in the embodiment, it is not waited until new free blocks are generated by compaction, but the frequency of writing in response to requests from the host and the frequency of writing for compaction are adjusted and the writing operations are appropriately switched therebetween. Accordingly, since the writing according to requests from the host is performed after the compaction ends, the possibility of increase in latency can be avoided.

FIG. 11 is a diagram illustrating the difference in bandwidth of writing in response to requests from the host between a case with a function of performing the frequency adjustment process (frequency adjustment function) according to the embodiment and a case without the frequency adjustment function with time. As illustrated in the upper part of FIG. 11, in the case without the frequency adjustment function, valid data are written over a plurality of pages during writing for compaction. Therefore, writing in response to requests from the host is interrupted for a long time. On the other hand, in the case with the frequency adjustment function as in the embodiment, writing operations are alternately switched in a manner, for example, that after performing writing in response to requests from the host is performed for one page, then writing for compaction is performed for two pages, as illustrated in the lower part of FIG. 11. Accordingly, the possibility that the writing in response to requests from the host is interrupted for a long time can be avoided. Therefore, according to the embodiment, compaction can be performed without significantly lowering the response speed to data write requests from the host.

Figure 10:
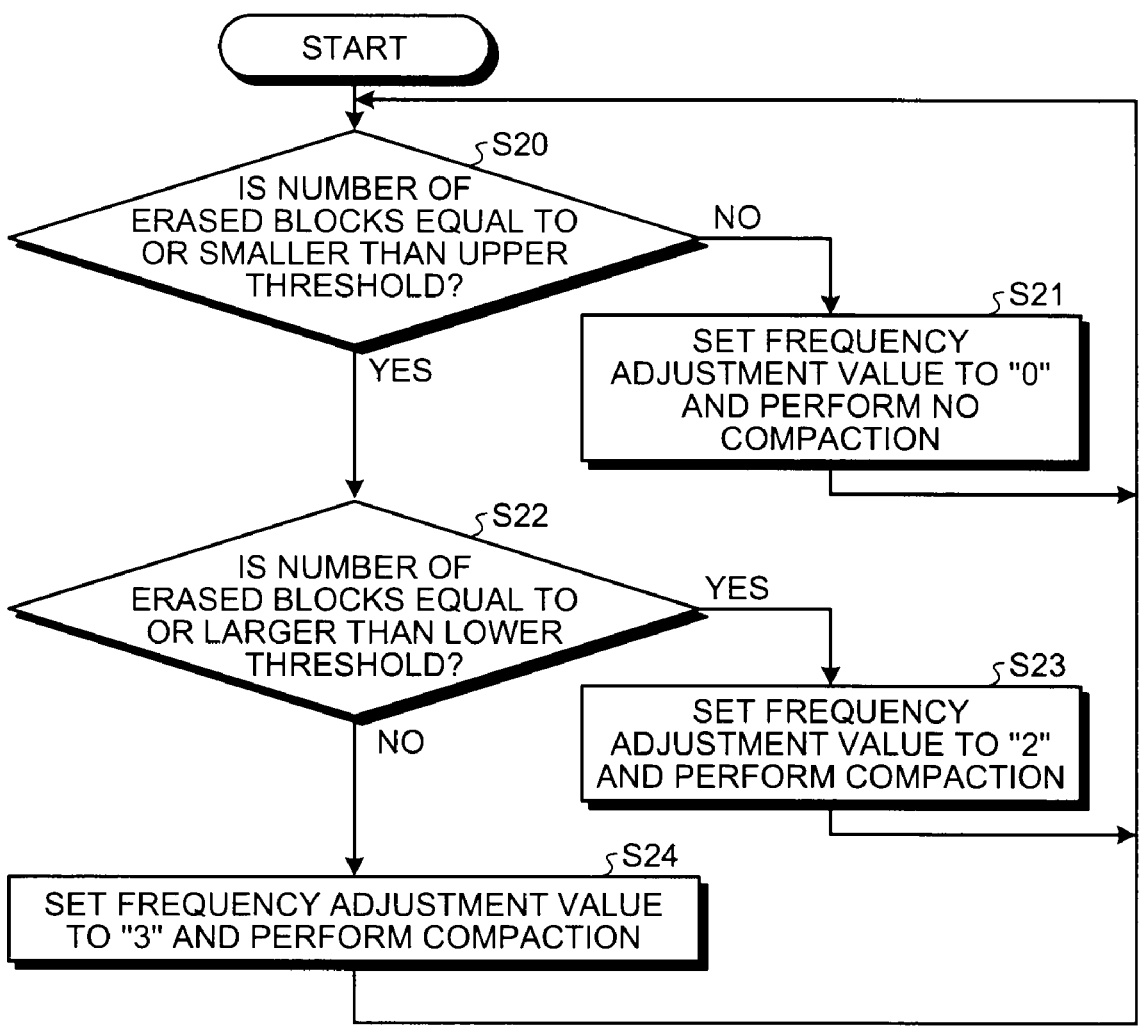
FIG. 10 is a flowchart illustrating procedures of a frequency adjustment value update process.

Next, procedures of a frequency adjustment value updating process to change the frequency of writing for compaction will be described using FIG. 10. The semiconductor memory device 50 determines whether or not the number of free blocks is equal to or smaller than the upper threshold (step S20). If the number of free blocks is larger than the upper threshold (NO in step S20), the semiconductor memory device 50 sets the frequency adjustment value of the frequency register 75 to "0", that is, the frequency adjustment value is set so that the number of writing operations for compaction is "0" for one writing operation in response to write commands from the host so as not to perform writing for compaction (step S21). When the number of free blocks is equal to or smaller than the upper threshold (YES in step S20), the semiconductor memory device 50 determines whether or not the number of free blocks is equal to or larger than the lower threshold (step S22). If the number of free blocks is equal to or larger than the lower threshold (YES in step S22), the semiconductor memory device 50 sets the frequency adjustment value of the frequency register 75 to "2", that is, the frequency adjustment value is set so that two writing operations for compaction are performed for one writing operation in response to write commands from the host (step S23). If the number of free blocks is smaller than the lower threshold (NO in step S22), the semiconductor memory device 50 sets the frequency adjustment value of the frequency register 75 to "3", that is, the frequency adjustment value is set so that three writing operations for compaction are performed for one writing operation in response to write commands from the host (step S24). The semiconductor memory device 50 updates the frequency adjustment value according to the number of the free blocks as described above.

As described above, the frequency adjustment value is dynamically updated according to the number of free blocks. That is, when the number of free blocks is smaller than the lower threshold, the frequency adjustment value is updated so that more writing operations for compaction are performed. Thus, the compaction is performed more frequently, and as a result, the number of free blocks can be increased. On the other hand, if the number of free blocks becomes larger than the upper threshold, the frequency adjustment value is updated so that no writing for compaction is performed. Thus, the compaction is not performed wastefully, and it is possible to respond to requests from the host with high responsiveness. By updating the frequency adjustment value according to the number of erased blocks to adjust the frequency of compaction in the log-structured method, it is possible to prevent the response speed to data write requests from the host from being extremely decreased.

MODIFIED EXAMPLES

The invention is not limited to the embodiment presented above, but may be embodied with various modified components in implementation without departing from the spirit of the inventions. Further, the invention can be embodied in various forms by appropriately combining a plurality of components disclosed in the embodiment. For example, some of the components presented in the embodiment may be omitted. Further, some components in different embodiments may be appropriately combined. In addition, various modifications as described below as examples may be made.

In the above-described embodiment, various programs executed in the semiconductor memory device 50 may be stored on a computer connected to a network such as the Internet, and provided by being downloaded via the network. The various programs may also be recorded on a computer readable recording medium such as a CD-ROM, a flexible disk (FD), a CD-R and a digital versatile disk (DVD) in a form of a file that can be installed or executed, and provided as a computer program product.

In the above-described embodiment, the lookup table and the bit vector table are stored in the DRAM 54, but the invention is not limited thereto. For example, the lookup table and the bit vector table may be stored in the semiconductor memory element 58 and cached in the DRAM 54 when these tables are used by the processor 51.

In the above-described embodiment, an ECC code is added to each data in a unit of a page as a page ECC. However, the ECC code may be added to a unit smaller than a page (for example, a unit of a sector of 512 bytes).

In the above-described embodiment, the semiconductor memory device 50 performs writing in response to write commands from the host and writing for compaction in a manner that one writing operation corresponds to a unit of a page. However, the invention is not limited thereto. For example, one writing operation may correspond to writing in two pages or to writing in a unit other than a page.

In the above-described embodiment, the channels correspond one-to-one to the semiconductor memory elements 58, but the invention is not limited thereto. The channels may correspond one-to-multiple to the semiconductor memory elements 58, that is, a plurality of semiconductor memory elements 58 may be allocated to one channel. In this case, identification numbers for identifying the respective semiconductor memory elements 58 are allotted to the semiconductor memory elements 58. The identification numbers and block numbers are recorded for each block of each channel in the lookup table. For example, if eight semiconductor memory elements are allocated to each channel, a total of 15 bits including 3 bits for identifying the semiconductor memory elements and 12 bits for identifying 4,096 blocks included in each semiconductor memory element are recorded as the identification number and the block number in the lookup table.

In the above-described embodiment, the semiconductor memory device 50 includes a plurality of semiconductor memory elements 58, but the invention is not limited thereto and the semiconductor memory device 50 may include only one semiconductor memory element 58.

In the above-described embodiment, a logical block address is added to data to be written in the semiconductor memory element 58 in the semiconductor memory device 50. However, the semiconductor memory device 50 may further include a physical-to-logical translation table showing association between the physical address of data written in the semiconductor memory element 58 and the logical block address of the data, instead of adding the logical block address. Then, the semiconductor memory device 50 may use the physical address of valid data read from the semiconductor memory element 58, refer to the lookup table to obtain the logical block address associated with the physical address, and update the lookup table as a result of compaction using the obtained logical block address.

In the above-described embodiment, the setting and updating of the frequency adjustment value are not limited to those presented above. Further, the semiconductor memory device 50 may be structured not to include the frequency register updating unit 76 and may set the frequency adjustment value as a fixed value without updating the frequency adjustment value.

In the above-described embodiment, a write control unit that performs writing in response to write commands from the host and a write control unit that performs writing for compaction are implemented by the NAND control unit 66. However, it may be structured such that the respective writing operations are performed by different write controllers.

According to an embodiment, garbage collection in the log-structured method can be performed without significantly decreasing response speed to data write requests from the host.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
a semiconductor memory chip having a plurality of storage areas;
a first write control unit configured to receive a request for writing first data associated with a logical block address from an information processing device, and perform a first writing of writing the first data in an unwritten location in an erased storage area from which data has been erased among the storage areas of the semiconductor memory chip;
a first storage unit configured to store therein association information representing association between a physical address indicating the location in which the first data is written and the logical block address associated with the first data;
a second write control unit configured to receive a request for writing third data associated with a same logical block address as that associated with second data, which is already written, and write the third data in an unwritten location in an erased storage area among the storage areas of the semiconductor memory chip;

a first updating unit configured to update the association information to association information indicating association between the logical block address and a physical address for the third data when the third data is written by the second write control unit;

a third write control unit configured to perform garbage collection by performing a second writing of writing fourth data, which is not invalid and which is in the storage area of the semiconductor memory chip in which the second data was previously written, in another storage area that is erased; and a frequency adjusting unit configured to adjust, according to a ratio set in advance, a frequency of the first writing in response to a request from the information processing device and a frequency of the second writing for the garbage collection.

2. The semiconductor memory device according to claim 1, wherein the frequency adjusting unit includes:

a register in which the ratio is set;

a determining unit configured to determine which of the first writing or the second writing is to be performed according to the ratio set in the register, a frequency at which the first writing has been performed and a frequency at which the second writing has been performed; and a selecting unit configured to cause the first write control unit to perform the first writing or the second write control unit to perform the second writing according to a determination by the determining unit.

3. The semiconductor memory device according to claim 1, further comprising:

a second storage unit configured to store therein invalidity information indicating whether or not data written in a physical address is invalid; and a changing unit configured to change the invalidity information to information indicating that the second data is invalid when the third data is written by the second write control unit.

4. The semiconductor memory device according to claim 3, further comprising:

a second updating unit configured to update setting of the ratio according to the number of unwritten storage areas for which the invalidity information of all data written therein is changed to information indicating that the data are invalid.

5. The semiconductor memory device according to claim 1, further comprising:

a setting unit configured to set a pointer pointing to a location to which writing is to be performed in the erased storage areas in the semiconductor memory chip, wherein, when writing in a storage area in the semiconductor memory chip is performed, the setting unit updates the pointer to point to a new location following the location to which the writing is performed.

6. The semiconductor memory device according to claim 1, wherein the first write control unit includes:

a splitting unit configured to split, when a size of the first data requested to be written is larger than a predetermined unit, the first data into pieces of the predetermined unit; and a writing unit configured to write the pieces of the first data thus split to respective storage areas of the semiconductor memory chip.

7. The semiconductor memory device according to claim 6, wherein the frequency adjusting unit adjusts the frequency of the first writing in the predetermined unit and the frequency of the second writing for the garbage collection according to the ratio.

8. The semiconductor memory device according to claim 6, further comprising:

a second storage unit configured to store therein invalidity information indicating whether or not data written in a physical address is invalid; and a changing unit configured to change the invalidity information to information indicating that the second data is invalid when the third data is written by the second write control unit, wherein the predetermined unit is a page, the pieces of the first data thus split are data in respective pages, the second storage unit stores therein the invalidity information indicating which page in the storage areas is not invalid, and the changing unit changes the invalidity information to information indicating that a page in which the second data was written is invalid.

9. The semiconductor memory device according to claim 8, wherein the third write control unit performs garbage collection by writing the fourth data, which is written in the page indicated as not being invalid by the invalidity information in the storage area, in another storage area that is erased.

10. The semiconductor memory device according to claim 8, wherein the third write control unit erases the storage area after completing writing of the page that is not invalid in another storage area.

11. The semiconductor memory device according to claim 9, wherein the third write control unit erases the storage area after completing writing of the page that is not invalid in another storage area.

12. The semiconductor memory device according to claim 8, wherein the first write control unit writes the pieces of the first data, which is split in the predetermined unit and to which the logical block address is added, in the storage areas of the semiconductor memory chip, and when the fourth data written in the page that is not invalid is written to another storage area as a result of the garbage collection, the first updating unit updates association information of the logical block address added to the fourth data to association information indicating association between the logical block address added to the fourth data and a new logical block address indicating a location to which the fourth data is written in the another storage area.

13. The semiconductor memory device according to claim 9, wherein the first write control unit writes the pieces of the first data, which is split in the predetermined unit and to which the logical block address is added, in the storage areas of the semiconductor memory chip, and when the fourth data written in the page that is not invalid is written to another storage area as a result of the garbage collection, the first updating unit updates association information of the logical block address added to the fourth data to association information indicating association between the logical block address added to the fourth data and a new logical block address indicating a location to which the fourth data is written in the another storage area.

* * * * *